United States Patent [19]
Shimoda

[11] 3,829,260
[45] Aug. 13, 1974

[54] WEAR-RESISTANT METAL OBJECT AND A METHOD FOR THE MANUFACTURE THEREOF

[75] Inventor: Yasunori Shimoda, Tachikawa, Japan

[73] Assignee: Nissan Motor Company Limited, Yokohama City, Japan

[22] Filed: June 30, 1972

[21] Appl. No.: 267,978

[30] Foreign Application Priority Data
Aug. 3, 1971  Japan.................................. 46-58577

[52] U.S. Cl..................... 418/178, 117/62, 117/71, 148/15.5, 148/16.6, 148/20.3, 148/31.5
[51] Int. Cl...... C23c 9/14, F01c 21/00, F04c 29/00
[58] Field of Search............... 418/113, 178, 179; 117/46 FS, 105.2, 62, 71; 277/235 A, 236; 106/1; 148/15.5, 16.6, 20.3, 31.5, 34, 32

[56] References Cited
UNITED STATES PATENTS

| | | | |
|---|---|---|---|
| 2,936,229 | 5/1960 | Shepard | 75/171 |
| 3,180,564 | 4/1965 | Fuhrmann et al. | 418/178 |
| 3,245,387 | 4/1966 | Froede | 418/179 |
| 3,428,442 | 2/1969 | Yurasko | 117/105.2 |
| 3,677,832 | 7/1972 | Van Thyne et al. | 148/20.3 |

FOREIGN PATENTS OR APPLICATIONS

| | | | |
|---|---|---|---|
| 1,811,916 | 6/1970 | Germany | 418/113 |
| 867,455 | 5/1961 | Great Britain | 117/105.2 |
| 907,355 | 10/1962 | Great Britain | 117/46 FS |

*Primary Examiner*—Charles N. Lovell

[57] ABSTRACT

Herein disclosed is an improved wear-resistant metal object and a method for the manufacture thereof. The metal object is formed by spraying fine particles of a nickel-chrome based self-fluxing alloy onto a surface of a base metal for forming a coating of the alloy on at least a portion of the surface of the base metal. The coating is usually fused so as to have the particles of the self-fluxing alloy interlocked with each other and strongly bonded to the base metal. Where desired, the resultant object is subjected to a soft-nitriding process for forming a nitrided hardened layer on the resultant object. The metal object thus produced has an increased resistance to wear and abrasion and is adapted for use in operations in which sliding movements occur in severe conditions as in the case of an apex seal of a Wankel rotary engine.

7 Claims, 3 Drawing Figures

WEAR-RESISTANT METAL OBJECT AND A METHOD FOR THE MANUFACTURE THEREOF

The present invention relates to a method for producing a wear-resistant metal object and, more particularly to a wear-resistant apex seal of a Wankel type rotary engine.

The Wankel type rotary engine usually has a three-lobe that revolves eccentrically around a shaft in a usually epitrochoidal chamber. The rotar slides at its vertices on the chamber wall through apex seals mounted at the vertices.

These apex seals slide on the chamber wall under extremely severe operating conditions and, as a consequence, are subject to wear and abrasion at a remarkably high rate. The apex seals for the Wankel rotary engine are, therefore, formed of an extremely costly material so as to prevent wear and abrasion of such seals.

For one thing, the lubrication for the apex seals involved various difficulties resulting from the use of a mixture of gasoline and oil in a proportion of about 150:1 to about 250:1 as a lubricant, in contrast to the usual reciprocating type engines in which the pistons are lubricated with a pure oil. The sliding velocity of the tops of the apex seals on the chamber wall, on the other hand, reaches the order of about 36 meters per second when the eccentric shaft revolves at a speed of 7,000 rpm. This sliding velocity is considerably higher than the sliding velocity of the piston in the engine cylinder of the reciprocating type engine. The temperature in the operating combustion chambers of the Wankel rotary engine, moreover, is presumed at range from about 250°C to about 450°C, which is apparently a cause of the enhanced wear of the apex seals. The gas pressure in the operating combustion chambers may also be taken into account as one of the severe operating conditions of the Wankel type rotary engine, reaching about 45 kilograms per millimeter square at a maximum.

An object of the present invention is therefore to provide a wear-resistant metal object which is especially adapted for use in forming an apex seal of a Wankel type rotary engine, although such metal object can be used for any other purposes which resistance to wear and abrasion resulting from sliding movements is an important requirement.

Another object of the present invention is to provide a method for producing a wear-resistant metal object which is economical and which is ready to be formed by simple steps.

The method achieving this object essentially consists in the step of spraying atomized self-fluxing alloy at least partly onto a base metal for forming a coating of the self-fluxing alloy on the surface of the base metal. The thus formed coating is preferably fused at a predetermined temperature so as to ensure axcellent bond between the coating and the base metal. Where desired, the resultant stock is further subjected to soft-nitriding treatment so as to have the stock coated with a relatively hard layer of nitride compounds.

The features and advantages of the method according to the present invention will become more apparent from the following description taken in conjunction with the accompanying drawing in which.

Figure 1:
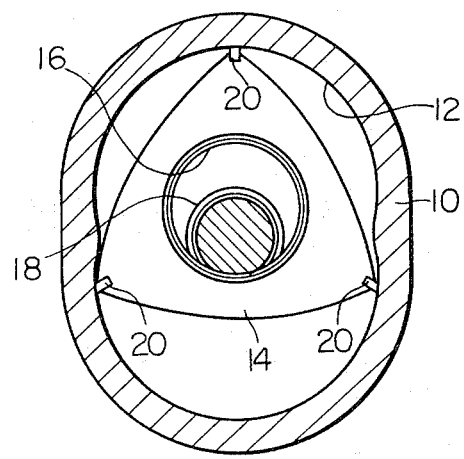
FIG. 1 is a cross sectional view showing essential operating parts of a Wankel type rotary engine.

Reference is first made to FIG. 1, in which the Wankel type rotary engine includes a rotor housing 10 defining therein an epitrochoidal chamber 12. A three-lobe rotor, 14 having an internal gear 16 is eccentrically rotatable in the chamber 12 around an external gear 18 meshing with the internal gear 16 of the rotor. The rotor 14 slides at its vertices on the chamber wall through tops of apex seals 20 which are mounted at the vertices of the rotor. As previously discussed, a great deal of heat is generated and an extremely high gas pressure is developed as the rotor 14 revolves in the chamber 12 and the apex seals 20 slides on the chamber wall at an extremely high velocity. The lubrication of the apex seals involves great difficulties because the lubricant mostly consists of the gasoline. The apex seals 20 are thus subject to wear and abrasion at a considerable rate and thus selection of the material of the apex seals is an important factor in aboiding the enhanced wear of the apex seals.

The wear-resistant metal object produced in the method according to the present invention finds typical application for forming the apex seals of the Wankel rotary engine as will be understood from the above description. The wear-resistant metal object provided by the present invention is, however, applicable for any other purposes where wear and abrasion of a moving member is of a great concern.

In the method according to the present invention, a base metal which may be main body of the apex seal of the Wankel rotary engine is first coated with a self-fluxing alloy through spraying of fine particles of the self-fluxing alloy. The base metal may be any of soft steel, structural carbon steel, cast iron cast steel, copper, a copper alloy and Monel metal although the soft steel or copper is preferred for its relatively low cost. The self-fluxing alloy to be sprayed in an atomized form is preferably nickel or a nickel-chrome or cobalt-chrome-molybdenum-iron based alloy, added with boron and/or silicon. The coating thus formed on the base metal any preferably be about 0.3 to 1.0 mm thick.

The coating formed by metal spraying is liable to be peeled off the base metal because the coating involves pores and is only mechanically bonded to the surface of the base metal. Such coating, moreover, contains a large amount of metal oxides which are detrimental to the wear resistive characteristics of the final material. To remove these defects of the coating, the metal object having the coating of the self-fluxing alloy may preferably be fused at a temperature of about 1,000°C to 1,250°C for 10 seconds to several minutes. As a result of this fusing step, the boron and silicon in the coating of the self-fluxing alloy is converted into diboron trioxide ($B_2O_3$) and silicon dioxide ($SiO_2$), respectively, and the metal oxides in the coating are converted into borosilicate glass floating over the fused coating in a dissolved state. The coating on the base metal is in this manner made free from pores and from metal oxides. In addition, the particles forming the coating are closely interlocked with each other and introduced into the base metal in a condition in which the particles of the base metal and coating are diffused on another, thereby forming an interlayer of an alloy between the base metal and coating. The object prepared in this matter displays a sufficient hardness by reason of the chromium boride (CrB) and dinickel monoboride ($Ni_2B$) contained in the solid solution of the nickel and chrome and, if the coating contains carbons, by reason of the eicosatrichromium hexacarbide ($Cr_{23}C_6$). Since, moreover, the coating on the base metal nickelchrome based, the coating has a resistance to oxidization and to an attack of sulfuric acid, hydrogen chloride, hydrofluoric acid, alkalis, sodium carbonate and other corrosive compounds.

Where desired, the wear-resistant metal object obtained in the above described method may be further subjected to the soft-nitriding process so as to have a hardened surface on the coating on the base metal or directly on a portion, if any, of the base metal which is intentionally left uncoated. For this purpose, the object to be treated is immersed in a molten salt of preferably potassium cyanate (KCNO) and heated to a temperature in the neighborhood of 570°C for about 60 to 120 minutes. The resulting object has a surface of nitrides which are mainly chromium nitrides thus adding to the hardness of the surface of the object. The surface of the nitrides is of a limited thickness and, therefore, substantially no deformation of the object results from the formation of the nitrided surface. The coating of the self-fluxing alloy on the base metal is in this manner afforded with improved resistance to wear and abrasion and, furthermore, the base metal has sufficient hardness over its area which is left uncoated with the self-fluxing alloy.

Figure 2:
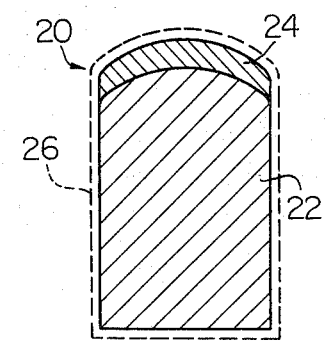
FIG. 2 is a sectional view showing an apex seal for the rotary engine, the apex seal being produced in the method according to the present invention.

FIG. 2 illustrates an apex seal 20 which is produced in the method above described. The apex seal 20 is formed of a base metal 22 of soft steel or copper, a coating 24 of the previously mentioned nickel-chrome based self-fluxing alloy applied to a sliding end of the apex seal, and a layer 26 of nitrides formed over the coating 24 and the uncoated area of the base metal 22.

Figure 3:
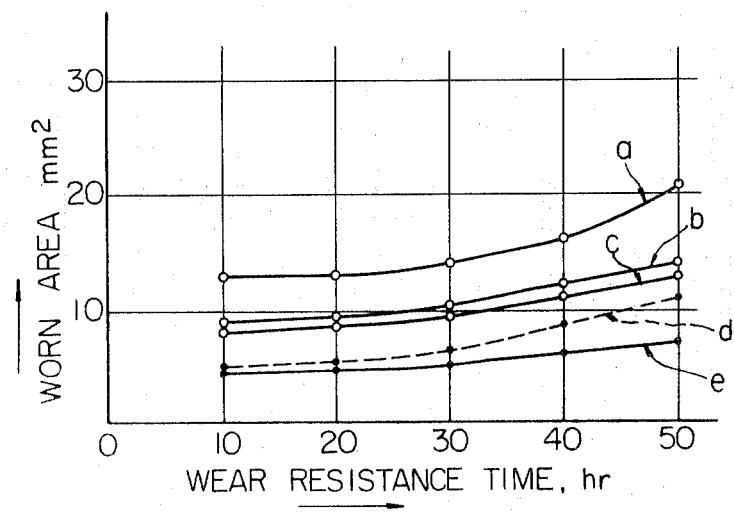
FIG. 3 is a graph indicating wear-resistance characteristics of various materials including the wear-resistant metal objects produced in the method according to the present invention.

The wear-resistant characteristics of the metal object produced in the method according to the present invention are indicated in FIG. 3 in comparison with materials of the conventional compositions such as carbon steel (curve a), sintered iron (curve b), and a circular cast iron (curve c). Curves d and e indicate the wear-resistant characteristics of the metal objects which are produced in the method according to the present invention. The curve d shows a case where the metal object has the coating of the self-fluxing alloy alone while the curve e shows a case where the metal object has both the coating of the self-fluxing alloy and the nitrided surface. The compositions of the self-fluxing alloy used to form these metal objects are indicated in the following table.

| Composition (%) | Cr | B | Si | C |
|---|---|---|---|---|
| Co-Cr-Mo-Fe based | 2.5±2 | 2.9±.7 | 1.2±.7 | 3.3±.3 |
| Ni-Cr based | 17±1.5 | 3.5±.2 | 4.4±.3 | .6±.1 |
| | W | Mo | Co | Fe | Cu | Ni |
| | 2.0±.5 | 7.0±1 | 3.0±2 | Bal | — | 5.0±.5 |
| | — | 2.0±.3 | 1 | 4.0 | 3.0±.5 | Bal |

The axis of abscissa indicates wear resistance time in terms of hour and the axis of cordinate indicates a worn area of the testpiece.

From FIG. 3, it is understood that the metal object which is produced in the method according to the present invention is significantly improved in its resistance to wear and abrasion as compared to the conventional materials used for forming elements which are subject to sliding movements under severe conditions.

Experiments have demonstrated that, where the wear-resistant metal object provided by this invention is used to form the apex seal of the Wankel rotary engine, the wear resistance of the apex seal is improved where the rotor housing is plated over its chamber wall with chrome or powder of nickel and silicon carbide, lasting for a prolonged period of time under the severe operating conditions.

What is claimed is:

1. A wear-resistant apex seal of a Wankel type rotary engine, comprising a base metal selected from a group consisting of soft steel, structural steel, cast iron, cast steel, copper, a copper alloy and Monel metal; a coating of a self-fluxing alloy on at least a portion of the surface of said base metal, said alloy comprising a base alloy selected from the group consisting of nickel based alloy, nickel-chrome based alloy, and cobalt-chrome-molybdenum-iron based alloy, and at least one self-fluxing component selected from the group consisting of boron and silicon; and a nitrided layer formed on at least a portion of said coating and on at least a portion of any uncoated area of said base metal.

2. A wear-resistant apex seal of a Wankel type rotary engine as claimed in claim 1, in which said coating is about 0.3 to 1.0 mm thick.

3. A wear-resistant apex seal of a Wankel type rotary engine as claimed in claim 1, wherein the nitrided layer is formed on the entire surfaces of said coating and any uncoated area of said base metal.

4. A method for producing a wear-resistant apex seal of a Wankel type rotary engine, comprising the steps of spraying an atomized self-fluxing alloy comprising a base alloy selected from the group consisting of nickel based alloy, nickel-chrome based alloy, and cobalt-chrome-molybdenum-iron based alloy and at least one self-fluxing component selected from the group consisting of boron and silicon on at least a portion of a base metal selected from a group consisting of soft steel, structural steel, cast iron, cast steel, copper, a copper alloy and Monel metal for forming a coating thereon, fusing said coating at a temperature ranging from about 1,050°C to about 1,250°C, and subsequently heating said coating at a temperature of about 570°C. in the presence of a bath of molten potassium cyanate for a period of time from about 60 to about 120 minutes for forming an outer layer of metal nitride.

5. A method as claimed in claim 4, in which said coating is about 0.3 to 1.0 mm thick.

6. A method as claimed in claim 4, in which said self-fluxing alloy is nickel and chrome based.

7. A method as claimed in claim 4, in which said self-fluxing alloy is cobalt-chrome-molybdenum-iron based.

* * * * *